United States Patent [19]
Walker et al.

[11] 3,893,527
[45] July 8, 1975

[54] MEANS AND TECHNIQUE FOR CONVERTING A MOTORCYCLE TO A SNOWMOBILE

[75] Inventors: Milo C. Walker, Seattle; Robert M. Bradford, Brier, both of Wash.

[73] Assignee: Snow-King Enterprises, Inc., Brier, Wash.

[22] Filed: June 4, 1973

[21] Appl. No.: 366,742

[52] U.S. Cl. .............................. 180/6 A; 280/7.12
[51] Int. Cl. ........................................... B62m 13/00
[58] Field of Search ............ 180/3 R, 6 R, 6 A, 5 R, 180/25 R, 27; 280/7.1, 7.12, 7.14, 8, 10

[56] References Cited
UNITED STATES PATENTS

| | | |
|---|---|---|
| 1,296,531 | 3/1919 | Landby ............................ 180/6 A |
| 1,933,101 | 10/1933 | DuPont et al. ..................... 180/25 R |
| 3,318,403 | 5/1967 | Hansen ............................. 180/5 R |
| 3,521,717 | 7/1970 | Coons .............................. 180/5 R |
| 3,630,301 | 12/1971 | Henricks .......................... 180/6 A |

*Primary Examiner*—David Schonberg
*Assistant Examiner*—R. Schrecengost
*Attorney, Agent, or Firm*—Christopher Duffy

[57] ABSTRACT

After the tandem wheels of a motorcycle have been removed from between the arms of the front and rear wheel-mounting yokes thereon, a ski is pivotally mounted inboard between the arms of the front yoke, and a pair of snow wheels is rotatably mounted outboard of the arms of the rear yoke.

18 Claims, 4 Drawing Figures

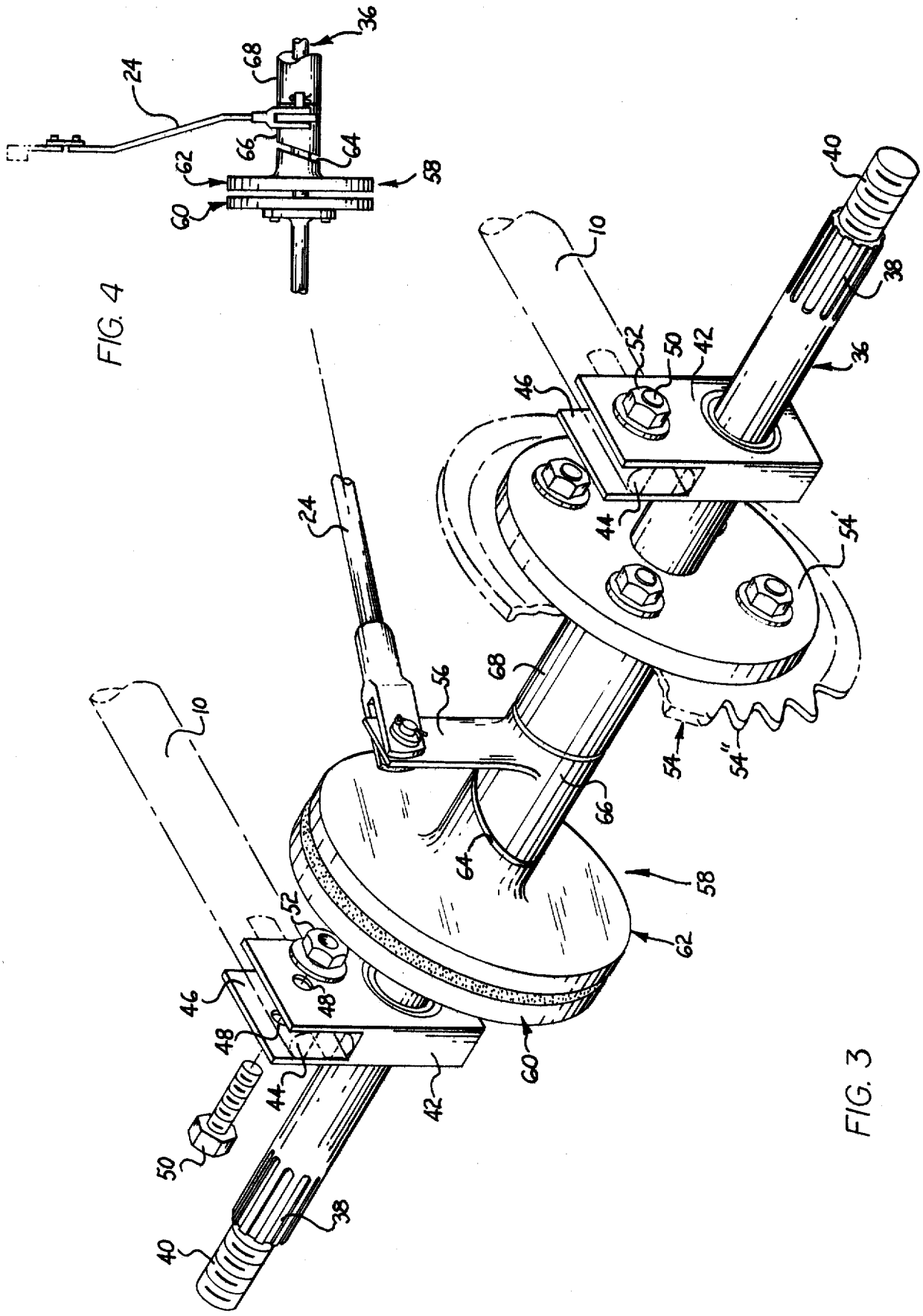

3,893,527

MEANS AND TECHNIQUE FOR CONVERTING A MOTORCYCLE TO A SNOWMOBILE

BACKGROUND FOR THE INVENTION

This invention relates to motorcycles and snowmobiles, and in particular to a means and technique for converting a motorcycle to a snowmobile. The conversion process is reversible and makes use of the existing motorcycle except for the tandem wheels thereof. For example, it makes full use of the existing chain and sprocket drive of the motorcycle, and full use of the foot-pedal-actuated brake mechanism of the motorcycle. It also makes full use of the shock absorber components of the front and rear wheel-mounting yokes of the motorcycle, as well as the yokes themselves. The gear ratio of the drive mechanism can be changed in the same manner as for the motorcycle itself, and the operator need not learn a new braking technique inasmuch as he uses the same brake pedal and linkage employed on the motorcycle. Moreover, since a pair of low-pressure balloon tires is substituted for the rear wheel of the motorcycle, the operator gets a softer ride than even that provided by the shock absorbers. The tires are accompanied by a ski at the front of the motorcycle, but altogether, the ski, the tires, and the means for mounting, driving and braking the same, add only about five or ten pounds to the stock weight of the motorcycle, so that the altered motorcycle may weight only 230–250 pounds, versus the 350–450 pounds that existing snowmobiles weigh. Of course, this is particularly important when the snowmobile is transported on another vehicle such as an automobile.

The conversion process is effected from a kit which in itself is not bulky and which is cheap to manufacture and easy to install. Also, the conversion process is quickly accomplished and does not require any special tools for the purpose. When it is not in use, the kit is cheaply and easily maintained, so that altogether the expense of owning the kit is minimal, even where it is given just seasonal use.

BRIEF DESCRIPTION OF THE DRAWINGS

The invention will be best understood by reference to the accompanying drawings which illustrate a presently preferred embodiment of the same.

In the drawings.

FIG. 3 is a part perspective view of the rear axle wheel mounting assembly employed in the altered motorcycle, including the drive and brake mechanisms employed therewith; and FIG. 4 is a part schematic, part rear elevational view of the assembly showing the brake mechanism in particular.

DESCRIPTION OF THE PREFERRED EMBODIMENT

Figure 1:
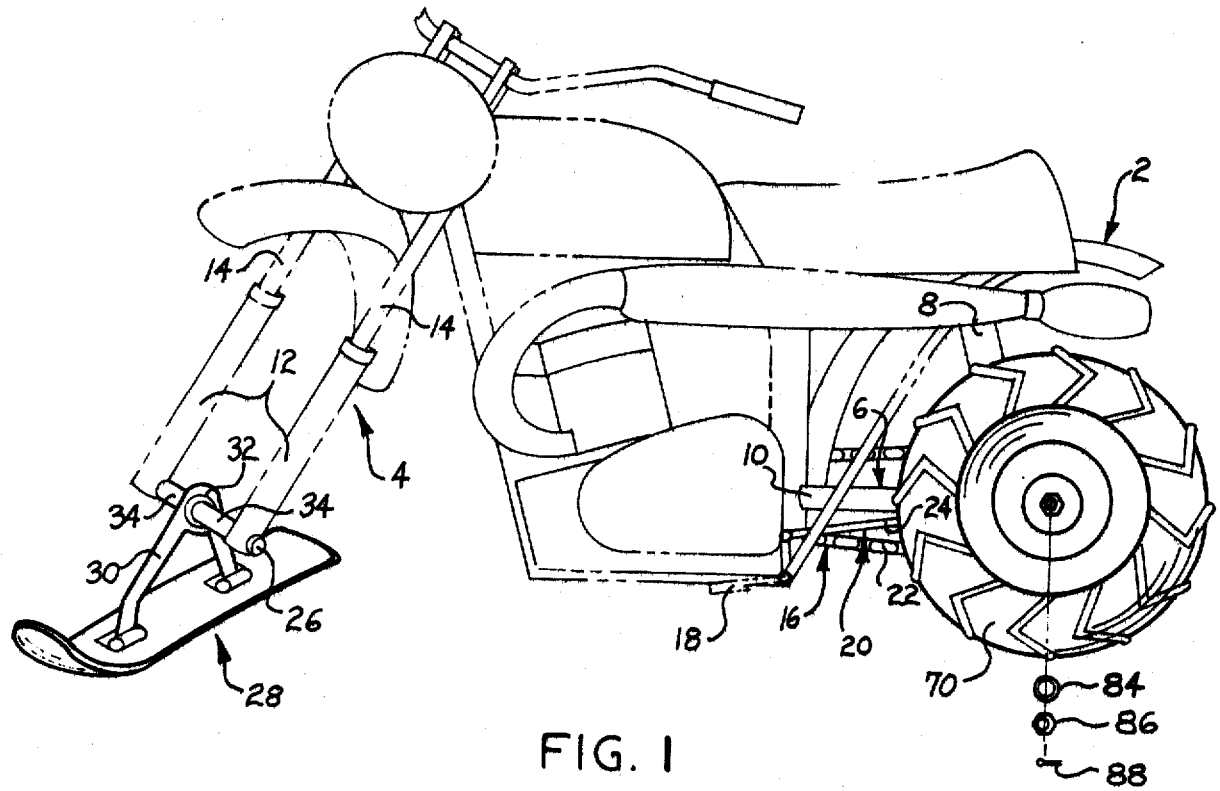
FIG. 1 is a part schematic, part exploded side elevational view of a conventional motorcycle after it has been altered according to the invention to serve as a snowmobile.

Referring to the drawings, it will be seen that the main body of the motorcycle has the usual open frame construction, and the frame 2 includes a pair of wheel-mounting yokes 4 and 6, at the forward and rearward ends thereof, respectively. The rear yoke 6 is somewhat obliquely inclined to the ground, and is mounted on the frame to pivot about a horizontal axis, there being a pair of shock absorbers 8 installed between the frame and the fork or arms 10 of the yoke to brace the yoke and to absorb the road energy imparted to the same through the rear wheel. The forward yoke 4 is more steeply inclined to the ground, and is pivotable about its own axis, there also being shock absorbers 12 in the fork or arms 14 thereof to absorb the road energy imparted to the front wheel. Normally, the front and rear wheels of the motorcycle are mounted in tandem within the forks 10 and 14 of the yokes, but in the illustrated condition of the motorcycle, they are omitted inasmuch as when the motorcycle was converted to a snowmobile, the wheels were removed and replaced with other equipment, as shall be explained.

The motorcycle also has the usual power plant, and the power is transmitted to the rear wheel assembly through a chain and sprocket drive mechanism 16, which in the illustrated embodiment, has been shifted to the new equipment, as shall be explained. In addition, the motorcycle has a brake pedal 18 pivotally mounted on one side or the other thereof, and as with the drive mechanism, the action of the pedal has been shifted to the new equipment, the braking action being transmitted through a rearwardly extending linkage 20 which is pivotally interconnected between the pedal and the brake, as shall be explained.

When converting the motorcycle to a snowmobile, the chain 22 of the drive mechanism 16 is disengaged, the rear link 24 of the brake mechanism is detached from the brake, and both wheels of the motorcycle are removed. After the front wheel is removed, the axle 26 of the same is returned to the front yoke 4 with a ski 28 mounted thereon. The ski has a bent, inverted U-shaped strut 30 fixed upright thereon, and the strut has a radial-bearing-equipped aperture 32 therethrough, by which the ski is journaled on the axle 26. In order to center the strut on the axle, a pair of spacer sleeves 34 are also added to the same between the strut and the respective arms 14 of the forward yoke.

After the rear wheel is removed, it is replaced with a wheel mounting assembly such as that illustrated in FIG. 3. The assembly comprises an elongated axle 36 having splined end portions 38 which are in turn reduced to a pair of threaded tips 40. Between the end portions thereof, the axle 36 has a pair of radial-bearing-equipped mounting blocks 42 rotatably engaged thereon. The blocks are employed to secure the assembly to the slotted rear ends 44 of the arms 10 of the rear yoke of the motorcycle. For the purpose, the blocks have edge-oriented slots 46 in the upper ends thereof, and holes 48 in the ends which oppose one another across the slots. After the slotted ends 44 of the arms of the yoke are slidably inserted in the slots, bolts 50 are passed through the holes 48 in the blocks and the slots in the ends 44 of the arms, and nuts 52 are secured on the bolts to clamp the blocks to the ends of the arms. Beforehand, however, the drive chain 22 of the motorcycle is passed about a heavy-duty sprocket 54 affixed to the axle 36 at a point between the two blocks 42. Thus, any slack in the chain can be taken up in the block clamping operation.

After the axle is mounted on the yoke, the rear link 24 of the brake mechanism of the motorcycle is clevised to the crank arm 56 of a friction disc brake assembly 58 which is mounted on the axle between the sprocket and the lefthand block in FIG. 3. The brake assembly 58 comprises a pair of friction discs 60 and 62, one 60 of which is affixed to the axle, or integral therewith, and the other 62 of which is rotatable on the axle and equipped with a mitered cam surface 64 on the sleeve thereof. The crank arm 56 is carried on a sleeve cam 66 which is rotatably engaged about the axle to cooperate with the cam surface 64 of the rotatable disc 62 for purposes of engaging and disengaging the two discs. The axle also has another sleeve 68 rotatably engaged thereon which serves as a spacer between the sleeve cam and the sprocket.

The sprocket 54 is in two parts, namely a hub part 54' and a toothed part 54", so that the gear ratio of the drive mechanism can be changed by exchanging the toothed part 54" for another of suitable dimension.

Figure 2:
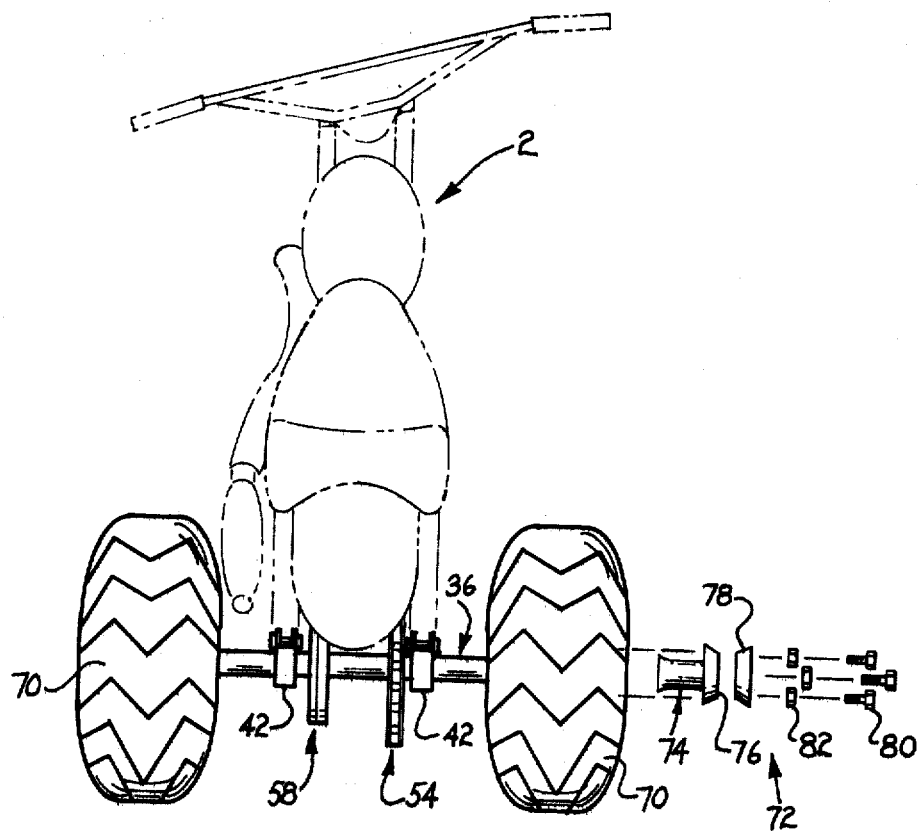
FIG. 2 is a part schematic, part exploded, rear elevational view of the altered motorcycle.

Either before or after the assembly is added to the motorcycle, it is equipped with a pair of low-pressure (4 psig.) balloon tires 70 which are mounted about the end portions of the axle on a pair of hub assemblies such as those seen at 72 in FIG. 2. Each hub assembly comprises a flanged sleeve 74 which is interiorly splined to engage with one end portion 38 of the axle 36, and whose flange 76 is end mitered to complement the miter of an end-mitered washer-like sleeve 78 which is bolted thereto to form a V-groove for the body of the wheel. See the bolts 80 and nuts 82. When each wheel 70 is mounted on the axle, a washer 84, nut 86 and cotter pin 88 assembly is secured to the adjacent tip 40 of the axle 36 to complete the conversion process.

What is claimed is:

1. In combination with a motorcycle body having front and rear yokes thereon, normally for mounting tandem ground-engaging wheels inboard between the respective arms thereof, and a chain and sprocket drive mechanism thereon, normally for driving the rear inboard ground-engaging wheel thereof, a modified ground engaging assembly comprising a pair of apertured axle mounting blocks releasably slidably engaged with the end portions of the arms of the rear yoke so as to assume fixed orientations thereon in which the apertures of the blocks are mutually opposed to one another across the rear yoke, means releasably clamping the blocks to the arms of the rear yoke in said orientations, axle means rotatably supported in the apertures of the blocks and projecting laterally outboard therefrom, ground engaging elements on the yokes including a pair of wheels fixed to the laterally projecting outboard portions of the axle means to rotate in conjunction therewith, and a sprocket fixed on the axle means and engaged within the chain of the drive mechanism to rotate the axle means under the power thereof, said clamping means including pin and slot connections between the blocks and the end portions of the arms of the rear yoke, the slots of which connections are elongated lengthwise of the drive mechanism to enable the chain to be tightened by sliding the blocks in relation to the arms of the rear yoke when the clamping means are released.

2. The combination according to claim 1 wherein the apertures in the blocks are disposed adjacent the end portions of the arms of the rear yoke so that the wheelbase of the modified ground engaging assembly is substantially the same as was that of the motorcycle when the tandem ground engaging wheels were mounted inboard of the yokes on the body thereof.

3. The combination according to claim 1 wherein the end portions of the arms of the rear yoke have apertured connector means thereon, the blocks are releasably slidably engaged with the connector means, and the clamping means include pin means which extend through the apertures in the connector means in engagement therewith.

4. The combination according to claim 3 wherein the connector means are integral with the main bodies of the arms of the rear yoke.

5. The combination according to claim 3 wherein the apertures in the connector means take the form of slots which are elongated lengthwise of the drive mechanism and the pin means are slidably engaged with the slots.

6. The combination according to claim 5 wherein the slots are adapted normally to receive the axle of the rear inboard ground engaging wheel of the motorcycle.

7. The combination according to claim 5 wherein the slots are open-ended at the ends of the arms of the rear yoke.

8. The combination according to claim 3 wherein the blocks depend from the connector means so that the apertures in the blocks, and the axle means supported therein, are disposed below the apertures in the connector means.

9. The combination according to claim 3 wherein the blocks have additional apertures therein which are spaced apart from the axle means and have the pin means extending therethrough in engagement with the blocks.

10. The combination according to claim 9 wherein the blocks have recesses in the front end faces thereof and the connector means are releasably slidably inserted in the recesses, said additional apertures opening into the recesses opposite the apertures in the connector means, and said pin means extending continuously through the apertures in the respective blocks and connector means, and projecting laterally outboard therefrom, there being clamping elements on the laterally projecting outboard portions of the pin means.

11. The combination according to claim 1 wherein the axle means takes the form of an axle which is adapted lengthwise to pass through the apertures in the blocks and to project laterally outboard therefrom.

12. The combination according to claim 11 wherein the sprocket is mounted on the inboard portion of the axle between the blocks.

13. The combination according to claim 1 wherein the motorcycle body also has a driver-actuated brake mechanism thereon, normally for braking the rear inboard ground engaging wheel thereof, and the modified ground engaging assembly further comprises a brake disc fixed to the axle means, and a brake transmission means operatively interconnecting the brake mechanism with the disc, to brake the rotation of the disc and the axle means, and thus the wheels, when the brake mechanism is actuated by the driver.

14. The combination according to claim 13 wherein the disc is mounted on the inboard portion of the axle means between the blocks.

15. The combination according to claim 14 wherein the brake transmission means includes a second disc which is relatively rotatably and axially shiftably mounted on the axle means opposite the brake disc, and cam means which are interconnected with the brake mechanism to shift the second disc into engagement with the brake disc when the brake mechanism is actuated by the driver.

16. The combination according to claim 1 wherein the ground engaging elements also include a ski pivotably mounted inboard between the arms of the front yoke.

17. A ground engaging assembly for modifying a motorcycle, the body of which has front and rear yokes thereon, normally for mounting tandem ground engaging wheels inboard between the respective arms thereof, and a chain and sprocket drive mechanism thereon, normally for driving the rear inboard ground engaging wheel thereof, said arms of the rear yoke having apertured connector means thereon, the apertures of which are elongated lengthwise of the drive mechanism, and said assembly comprising a pair of apertured axle mounting blocks which are releasably slidably engagable with the connector means so as to assume fixed orientations on the arms of the rear yoke in which the apertures of the blocks are mutually opposed to one another across the rear yoke, means for releasably clamping the blocks to the arms of the rear yoke in said orientations, axle means rotatably supportable in the apertures of the blocks and projectable laterally outboard therefrom, ground engaging elements for the body of the motorcycle, including a pair of wheels fixable to the laterally projecting outboard portions of the axle means to rotate in conjunction therewith, and a sprocket fixable on the axle means and engagable within the chain of the drive mechanism to rotate the axle means under the power thereof, said clamping means including pin means which are operatively laterally projectable from the blocks and slidably engagable in the apertures of the connector means so that the chain can be tightened by sliding the blocks in relation to the arms of the rear yoke when the clamping means are released, and said pin means being operatively disposed adjacent the apertures in the blocks so that the wheelbase of the ground engaging assembly is substantially the same on the motorcycle as was that of the motorcycle when the tandem ground engaging wheels were mounted inboard of the yokes on the body thereof.

18. In combination, a motorcycle body having a front yoke thereon normally for mounting one of a pair of ground engaging wheels inboard between the respective arms thereof, a rear yoke thereon, and a chain and sprocket drive mechanism thereon, normally for driving the other ground engaging wheel inboard between the respective arms of the rear yoke, said rear yoke having axle mounting means on the end portions of the arms thereof, defining apertures which are mutually opposed to one another across the yoke adjacent the arms thereof, axle means rotatably supported in the apertures and projecting laterally outboard therefrom, ground engaging elements on the yokes including a pair of wheels fixed to the laterally projecting outboard portions of the axle means to rotate in conjunction therewith, and a sprocket fixed on the axle means and engaged within the chain of the drive mechanism to rotate the axle means under the power thereof, said axle mounting means being slidably engaged with the arms of the rear yoke in fixed orientations thereon, and having means carried thereon for releasably clamping the axle mounting means to the arms of the rear yoke, said clamping means including pin and slot connections between the axle mounting means and the arms of the rear yoke, the slots of which connections are elongated lengthwise of the drive mechanism to enable the chain to be tightened by sliding the axle mounting means in relation to the arms of the rear yoke when the clamping means are released.

* * * * *